US009216770B2

(12) United States Patent
Delord

(10) Patent No.: US 9,216,770 B2
(45) Date of Patent: Dec. 22, 2015

(54) MOTOR VEHICLE INCLUDING AN UPPER FIREWALL CROSSBEAM

(71) Applicant: RENAULT s.a.s., Boulogne-Billancourt (FR)

(72) Inventor: Christian Delord, Pavillons Sous Bois (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/362,012

(22) PCT Filed: Nov. 30, 2012

(86) PCT No.: PCT/EP2012/074016
§ 371 (c)(1),
(2) Date: Jul. 1, 2014

(87) PCT Pub. No.: WO2013/079627
PCT Pub. Date: Jun. 6, 2013

(65) Prior Publication Data
US 2014/0354011 A1    Dec. 4, 2014

(30) Foreign Application Priority Data

Dec. 2, 2011  (FR) ...................................... 11 61094

(51) Int. Cl.
*B60S 1/04* (2006.01)
*B62D 25/08* (2006.01)
*B62D 25/14* (2006.01)

(52) U.S. Cl.
CPC .............. *B62D 25/081* (2013.01); *B62D 25/14* (2013.01); *B62D 25/145* (2013.01)

(58) Field of Classification Search
CPC .... B62D 25/145; B62D 25/087; B62D 25/14; B62D 25/2027; Y10T 29/49622; B60R 19/34; B60R 19/18; F16F 7/12

USPC ............ 296/192, 193.02, 203.02, 72, 193.09, 296/204, 70
See application file for complete search history.

(56) References Cited

U.S. PATENT DOCUMENTS 4,285,540 A * 8/1981 Harada ..................... B60H 1/28
                                                    15/250.05
4,466,654 A * 8/1984 Abe ....................... B62D 25/081
                                                    15/250.16

(Continued)

FOREIGN PATENT DOCUMENTS

DE          44 22 498        10/1995
FR          2 900 122        10/2007

(Continued)

OTHER PUBLICATIONS

International Search Report Issued Feb. 7, 2013 in PCT/EP12/074016 Filed Nov. 30, 2012.

(Continued)

*Primary Examiner* — Kiran B Patel
(74) *Attorney, Agent, or Firm* — Oblon, McClelland, Maier & Neustadt, L.L.P.

(57) ABSTRACT

A motor vehicle including a motor vehicle body defined by two body sides and a vehicle floor, and a wall attached laterally to the body sides and transversely to the floor, to separate a passenger compartment of the vehicle from the engine compartment. The motor vehicle further includes an upper firewall crossbeam having a cross-section that opens toward outside of the vehicle, and which is closed by the wall. The upper firewall crossbeam is omega-shaped, including a first portion configured to be attached onto the wall and a second portion configured to be attached onto the wall, the first and second portions being connected via swaged portions, the first portion extending toward the engine compartment of the vehicle via a first swaged portion, which is inclined relative to a longitudinal axis of the vehicle. The upper crossbeam includes openings configured to engage with a mechanism for attaching windshield-wiper crankpins.

7 Claims, 4 Drawing Sheets

(56) References Cited

U.S. PATENT DOCUMENTS

| | | | | |
|---|---|---|---|---|
| 4,470,341 A * | 9/1984 | Hirukawa | B62D 25/081 | 454/146 |
| 4,750,780 A * | 6/1988 | Harasaki | B62D 25/081 | 296/192 |
| 4,753,475 A * | 6/1988 | Mochida | B62D 25/12 | 180/69.21 |
| 4,767,153 A * | 8/1988 | Kawasaki | B60H 1/00535 | 180/90 |
| 4,869,546 A * | 9/1989 | Sato | B62D 25/081 | 296/192 |
| 4,900,082 A | 2/1990 | Schwuchow et al. | | |
| 4,909,566 A * | 3/1990 | Hashimoto | B60H 1/24 | 296/192 |
| 5,061,009 A * | 10/1991 | Harasaki | B62D 25/14 | 296/192 |
| 5,562,329 A * | 10/1996 | Srock | B62D 25/082 | 296/187.09 |
| 6,193,304 B1 * | 2/2001 | Takahashi | B60J 1/02 | 296/187.04 |
| 6,193,305 B1 * | 2/2001 | Takahashi | B62D 21/15 | 296/187.04 |
| 6,378,934 B1 * | 4/2002 | Palazzolo | B60H 1/0055 | 296/208 |
| 6,637,798 B2 * | 10/2003 | Hoshikawa | B62D 25/081 | 296/96.15 |
| 7,552,964 B2 * | 6/2009 | Saito | B60J 1/02 | 296/187.04 |
| 7,845,716 B2 * | 12/2010 | Kiyotake | B62D 21/152 | 296/203.02 |
| 8,523,264 B2 * | 9/2013 | Kuroki | F16F 7/1028 | 296/192 |
| 2005/0134089 A1 * | 6/2005 | Borkowski | B60H 1/28 | 296/192 |
| 2009/0146459 A1 * | 6/2009 | Watanabe | B60H 1/28 | 296/192 |
| 2013/0229031 A1 * | 9/2013 | Bisror | B62D 25/14 | 296/201 |
| 2014/0367994 A1 * | 12/2014 | Sasaki | B62D 25/08 | 296/187.09 |
| 2015/0015030 A1 * | 1/2015 | Sasaki | B62D 25/088 | 296/192 |

FOREIGN PATENT DOCUMENTS

| | | |
|---|---|---|
| GB | 2 206 085 | 12/1988 |
| JP | 2007 30627 | 2/2007 |

OTHER PUBLICATIONS

French Search Report Issued Mar. 28, 2012 in French Application No. 1161094 Filed Dec. 2, 2011.

* cited by examiner

MOTOR VEHICLE INCLUDING AN UPPER FIREWALL CROSSBEAM

The present invention relates to the field of motor vehicles and especially the frontal part of motor vehicles.

By "frontal part" there is understood the front structure comprising a transverse partition known as a "firewall", separating the passenger compartment of a motor vehicle from the engine compartment, a dashboard crossbeam situated below the windshield, a dashboard, a lower window crossbeam extending substantially parallel to the dashboard crossbeam, in order in particular to reinforce the dashboard crossbeam, as well as a heating partition joined to the transverse partition.

In order to reinforce the transverse partition, it is known to provide an upper firewall crossbeam, making it possible to protect the braking system or servo brake in the event of a head-on collision. In fact, the servo brake is generally situated in the upper part of the transverse partition. Furthermore, it is known to provide systems for fixation of windshield wiper crank pins.

In certain motor vehicles, the firewall crossbeam is constituted by an assembly of parts joined together by welding.

Document FR 2921886, which describes a central firewall crossbeam, proposes a single firewall crossbeam in order to reduce the number of parts as well as the welding steps.

Nevertheless, such a crossbeam does not permit the servo brake to be protected or means for fixation of windshield wiper crank pins to be integrated.

The purpose of the present invention is therefore to remedy these disadvantages.

One objective of the invention is therefore to provide a motor vehicle comprising an upper firewall crossbeam making it possible simultaneously to assure protection of the braking system, evacuation of water under the window crossbeam, as well as fixation of windshield wiper crank pins without creating transverse overcrowding or overweight, all while being simple to use and inexpensive.

According to one embodiment, the object of the invention is a motor vehicle comprising a motor vehicle body bounded by two body sides and a vehicle floor, a wall fixed laterally to the body sides and transversely to the vehicle floor, and intended to separate the passenger compartment of the vehicle from an engine compartment, and an upper firewall crossbeam having a transverse section opening toward the passenger compartment of the vehicle and closed by the wall.

The upper firewall crossbeam is omega-shaped comprising a first portion intended to be fixed to the wall and a second portion intended to be fixed to the wall. The first and second portions are, for example, joined by swaged portions.

The upper crossbeam comprises orifices capable of cooperating with means for fixation of windshield wiper crank pins.

Thus the specific shape of the upper firewall crossbeam, schematically representing an omega shape, makes it possible to make the upper part of the wall rigid in the event of a head-on collision of the motor vehicle with an external element, and in particular makes it possible to retain an element such as a braking system or servo brake, generally situated in the upper part of the wall, in the event of a head-on collision between the motor vehicle and an external element and thus to limit its intrusion into the passenger compartment of the vehicle. Furthermore, the windshield wipers are directly fixed on the upper firewall crossbeam without addition of supplementary parts.

Advantageously, the upper firewall crossbeam conforms with the shape of the wall.

For example, the first portion is extended toward the engine compartment of the vehicle by a first swaged portion. In non-limitative manner, the first portion may be inclined relative to a longitudinal axis of the vehicle.

For example, the first portion is extended toward the engine compartment of the vehicle by a first swaged portion, inclined relative to a longitudinal axis of the vehicle. Thus the inclined surface of the first swaged portion makes it possible for water to run off naturally toward the front of the motor vehicle.

Advantageously, the first and second portions respectively of the upper crossbeam are fixed sealingly to the wall by spot welds. In fact, such a crossbeam requires only two lines of spot welds and two lines of sealing means, such as putty, for example, which makes it possible to reduce the cost and duration of assembly.

In one embodiment, the wall comprises a transverse partition intended to be fixed to the vehicle floor and a heating partition intended to be fixed to the transverse partition.

Advantageously, the upper firewall crossbeam is intended to be fixed by a first portion to the heating partition and by a second portion to the transverse partition. Thus the specific shape of the upper firewall crossbeam makes it possible more particularly to make the upper part of the wall or transverse partition, known as "firewall", rigid in the event of a head-on collision of the motor vehicle with an external element.

The transverse section of the upper firewall crossbeam opening toward the passenger compartment of the vehicle is intended, for example, to be closed by the heating partition or by the transverse partition.

The upper crossbeam may be made of swaged sheet metal or by any other constructional method, such as profiling, for example.

Other objectives, characteristics and advantages of the invention will become apparent upon reading the description hereinafter, provided solely by way of non-limitative example and composed with reference to the attached drawings, wherein:

FIG. 1 schematically represents a frontal part of a motor vehicle according to the invention;

Figure 2:
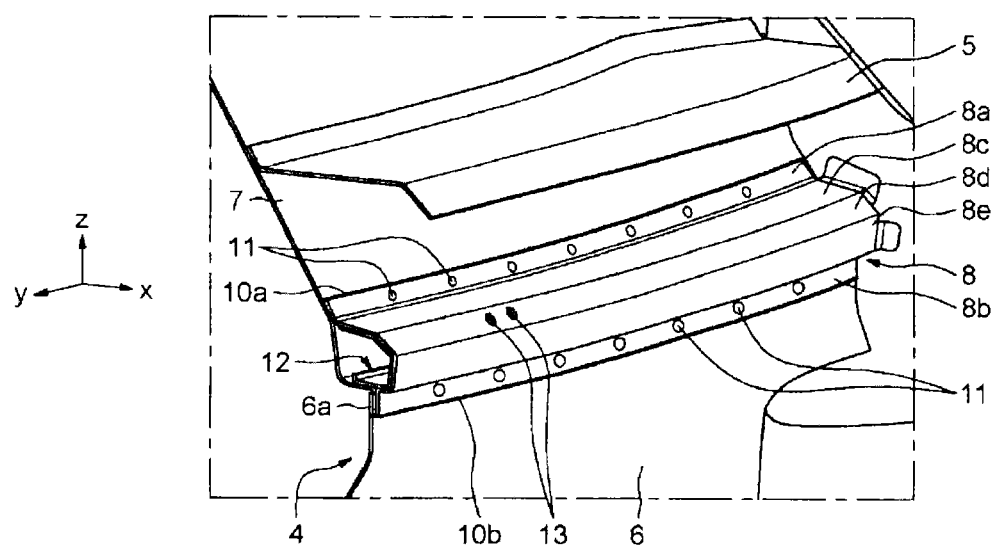
FIG. 2 illustrates a detail of the upper firewall crossbeam according to FIG. 1.

In the course of the description, the terms "longitudinal", "transverse", "vertical", "front", "rear", "left" and "right" are understood relative to the usual orthogonal frame of reference of motor vehicles, represented in FIG. 2 and comprising:

- a longitudinal axis X, horizontal and directed from the rear to the front of the vehicle;
- a transverse axis Y, horizontal, perpendicular to axis X and directed from left to right of the vehicle moving in forward direction;
- an axis Z, orthogonal to axes X and Y and vertical.

Figure 1:
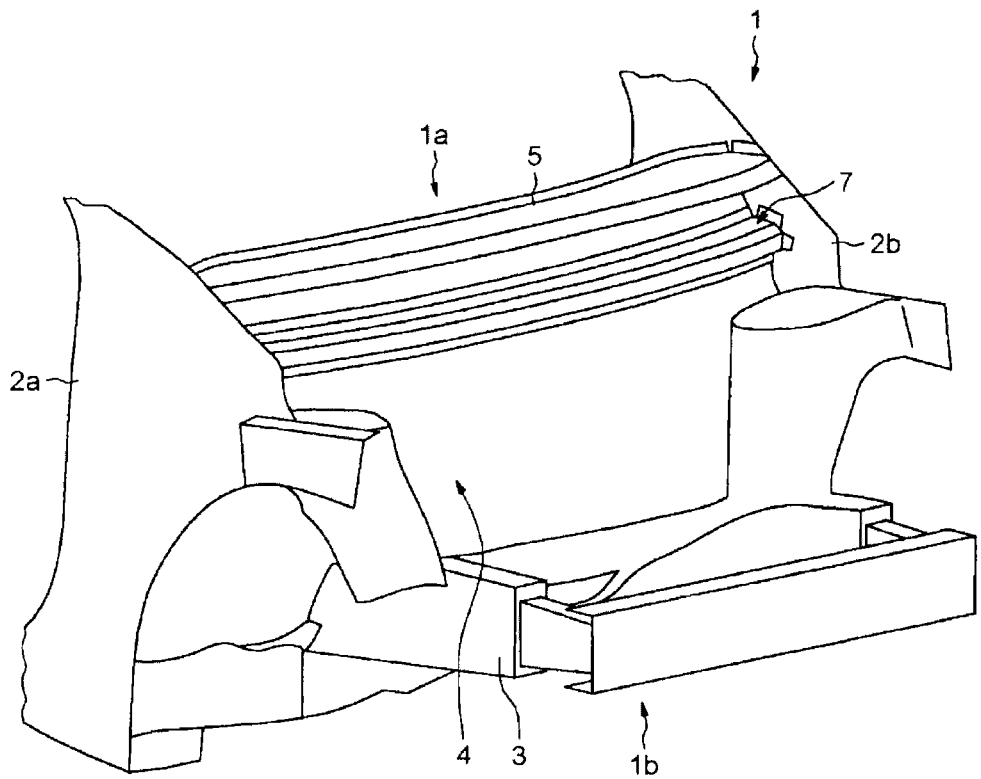

As illustrated in FIG. 1, a frontal part of a motor vehicle, denoted by 1 on the whole, comprises a body bounded by two body sides 2a, 2b and a vehicle floor, one part 3 of which is represented in FIG. 1. The body defines an interior 1a and an exterior of vehicle 1. The interior 1a of vehicle 1 represents the passenger compartment of vehicle 1.

The front structure of motor vehicle 1 comprises a wall 4 separating passenger compartment 1a of motor vehicle 1 from an engine compartment 1b, a dashboard crossbeam (not represented) situated underneath the windshield (not represented) and a lower window crossbeam 5, extending substantially parallel to the dashboard crossbeam.

Figure 3:
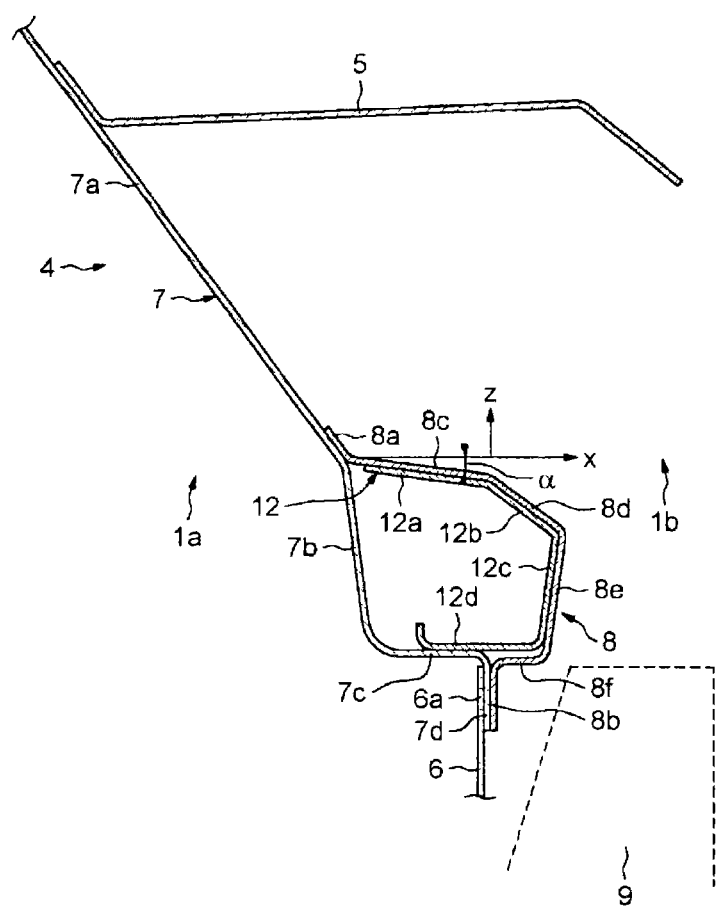
FIG. 3 illustrates a transverse section of FIG. 2.

As illustrated in FIGS. 2 and 3, wall 4 comprises a transverse partition 6 known as "firewall", disposed behind engine compartment 1b, and a heating partition 7 joined to transverse partition 6. Transverse partition 6 is disposed in motor vehicle 1 transversely along axis Y, between body sides 2a, 2b, and horizontally between floor 3 and heating partition 7. In the embodiment illustrated in FIGS. 2 and 3, heating partition 7 comprises a first portion 7a, inclined relative to vertical axis Z, intended to be fixed to lower window crossbeam 5 and extending toward transverse partition 6 by a second portion 7b, inclined relative to first portion 7a. Second portion 7b is extended toward engine compartment 1b of vehicle 1 by a substantially horizontal portion 7c then by a fourth substantially vertical portion 7d for fixation to transverse partition 6. Alternatively, first and second portions 7a, 7b may be substantially vertical and substantially horizontal portion 7c may be inclined relative to longitudinal axis X.

To reinforce transverse partition 6 in an upper part 6a close to heating partition 7, motor vehicle 1 comprises an upper firewall crossbeam 8. Upper firewall crossbeam 8 makes it possible to make upper part 6a of transverse partition 6 rigid and to prevent intrusion of braking system 9, or servo brake, in the event of head-on collision between motor vehicle 1 and an external element (not represented). In fact, servo brake 9, illustrated by dashed lines in FIG. 3, is generally situated in upper part 6a of transverse partition 6.

Upper firewall crossbeam 8, made, for example, of swaged sheet metal, is disposed in motor vehicle 1 transversely along axis Y, between body sides 2a, 2b.

Upper firewall crossbeam 8 comprises a first portion 8a intended to be fixed on first portion 7a of heating partition 7. In the illustrated embodiment, first portion 8a is inclined relative to vertical axis Z. Upper firewall crossbeam 8 comprises a second substantially vertical portion 8b intended to be fixed to transverse partition 6. First portion 8a of upper crossbeam 8 conforms to the shape of first portion 7a of heating partition 7.

First and second portions 8a, 8b are joined by swaged portions 8c, 8d, 8e, 8f. First portion 8a is extended toward the front of motor vehicle 1 by a first swaged portion 8c, inclined relative to longitudinal axis X by an angle a, for example of 8°. First swaged portion 8c is extended toward the front of the vehicle, especially toward engine compartment 1b, by a second swaged portion 8d, for example, inclined relative to first swaged portion 8c and extended in turn by a third substantially vertical swaged portion 8e, then by a fourth substantially horizontal swaged portion 8f.

In the example illustrated in FIGS. 2 and 3, upper firewall crossbeam 8 has a transverse section opening toward passenger compartment 1a of vehicle 1 and closed by heating partition 7.

First and second portions 8a, 8b of upper firewall crossbeam 8 are respectively fixed sealingly by sealing means 10a, 10b to heating partition 7 and to transverse partition 6 and by spot welds 11, such as illustrated in FIG. 2.

Alternatively, a crossbeam reinforcement 12 is disposed between upper firewall crossbeam 8 and heating partition 7. Crossbeam reinforcement 12 comprises swaged portions 12a, 12b, 12c, 12d respectively conforming to the shape of swaged portions 8c, 8d, 8e and 8f of upper firewall crossbeam 8. Fourth swaged portion 12d of crossbeam reinforcement 12 is in contact with substantially horizontal portion 7c of heating partition 7.

Crossbeam reinforcement 12, welded to upper firewall crossbeam 8, also has a transverse section opening toward passenger compartment 1a of vehicle 1 and closed by heating partition 7.

As illustrated in FIG. 2, upper firewall crossbeam 8 comprises orifices 13 capable of cooperating with means for fixation of windshield wiper crank pins (not represented).

Figure 4:
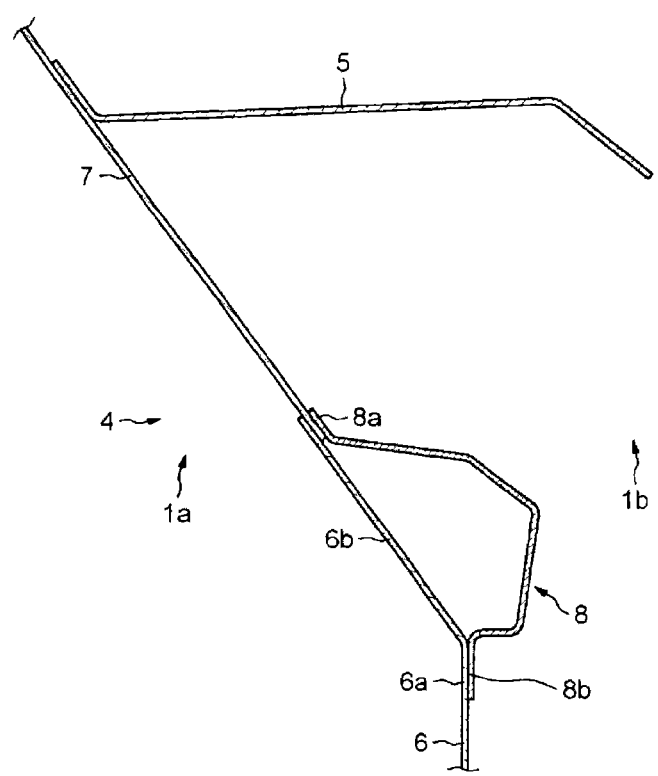
FIGS. 4 and 5 illustrate variants of FIG. 3.
Figure 5:
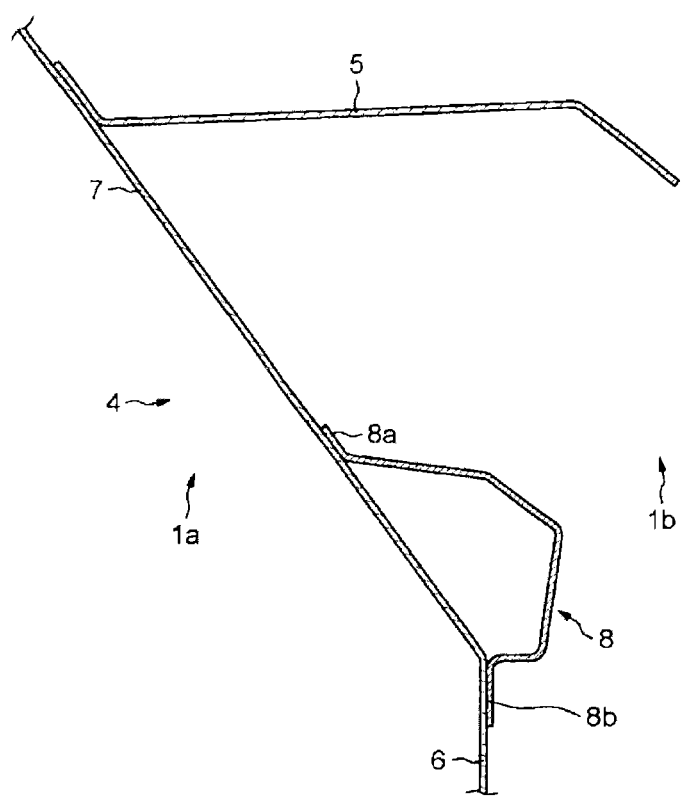

The embodiments of FIGS. 4 and 5, in which like elements have like reference numerals, differ from the embodiment illustrated in FIGS. 2 and 3 only by the structure of separating wall 4 between passenger compartment 1a and engine compartment 1b of vehicle 1.

As illustrated in FIG. 4, upper part 6a of transverse partition 6 is prolonged toward heating partition 7 by a second part 6b substantially inclined relative to upper part 6a.

In this embodiment, the transverse section of upper firewall crossbeam 8, opening toward passenger compartment 1a of vehicle 1, is closed by transverse partition 6, and in particular by second part 6b.

A reinforcement (not represented in this figure) could also be welded to upper firewall crossbeam 8 in a manner identical to that of the embodiment of FIG. 3.

As illustrated in FIG. 5, separating wall 4 is formed by a single metal sheet forming heating partition 7 and transverse partition 6.

In this embodiment, the transverse section of upper firewall crossbeam 8, opening toward passenger compartment 1a of vehicle 1, is closed by separating wall 4.

A reinforcement (not represented in this figure) could also be welded to upper firewall crossbeam 8 in a manner identical to that of the embodiment of FIG. 3.

By virtue of the invention that has just been described, the motor vehicle comprises an upper firewall crossbeam making it possible simultaneously to assure protection of the braking system, evacuation of water under the window crossbeam and fixation of windshield wiper crank pins, thus reducing the number of parts to be assembled.

In addition, such a crossbeam causes little transverse overcrowding or overweight and remains simple to use and inexpensive.

The invention claimed is:

1. A motor vehicle comprising:
   a motor vehicle body bounded by two body sides and a vehicle floor;
   a wall fixed laterally to the body sides and transversely to the vehicle floor, and configured to separate a passenger compartment of the vehicle from an engine compartment; and
   an upper firewall crossbeam having a transverse section opening toward the passenger compartment of the vehicle and closed by the wall,
   wherein the upper firewall crossbeam is omega-shaped and comprises a first portion configured to be fixed to the wall and a second portion configured to be fixed to the wall, the first and second portions being joined by swaged portions, the first portion being extended toward the engine compartment of the vehicle by a first swaged portion, inclined relative to a longitudinal axis of the vehicle, and
   wherein the upper crossbeam comprises orifices configured to cooperate with means for fixation of windshield wiper crank pins.

2. A motor vehicle according to claim 1, wherein the upper firewall crossbeam conforms with a shape of the wall.

3. A motor vehicle according to claim 1, wherein the first and second portions respectively of the upper crossbeam are fixed sealingly to the wall by spot welds.

4. A motor vehicle according to claim 1, wherein the wall comprises a transverse partition configured to be fixed to the vehicle floor and a heating partition configured to be fixed to the transverse partition.

5. A motor vehicle according to claim 4, wherein the upper firewall crossbeam is configured to be fixed by a first portion to the heating partition and by a second portion to the transverse partition.

6. A motor vehicle according to claim 4, wherein the transverse section of the upper firewall crossbeam opening toward the passenger compartment of the vehicle is configured to be closed by the heating partition or by the transverse partition.

7. A motor vehicle according to claim 1, wherein the upper crossbeam is made of swaged sheet metal.

* * * * *